Jan. 22, 1963 R. B. GUGGEMOS 3,074,654
CONTROL SYSTEM FOR LOADING AND WEIGHING ASSEMBLY
Filed Oct. 10, 1958 2 Sheets-Sheet 1
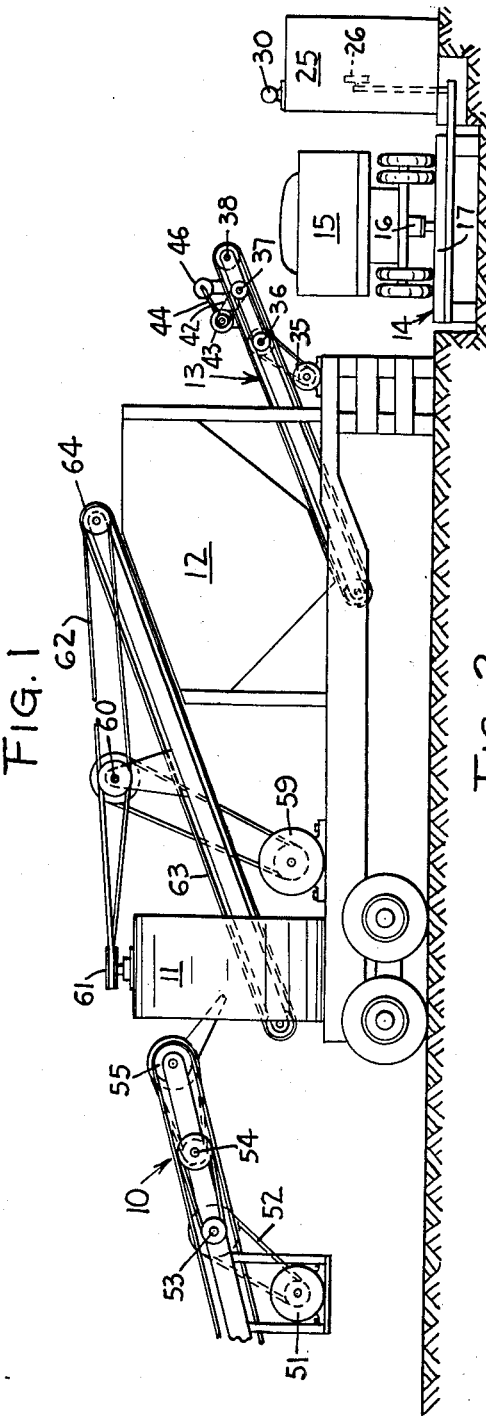
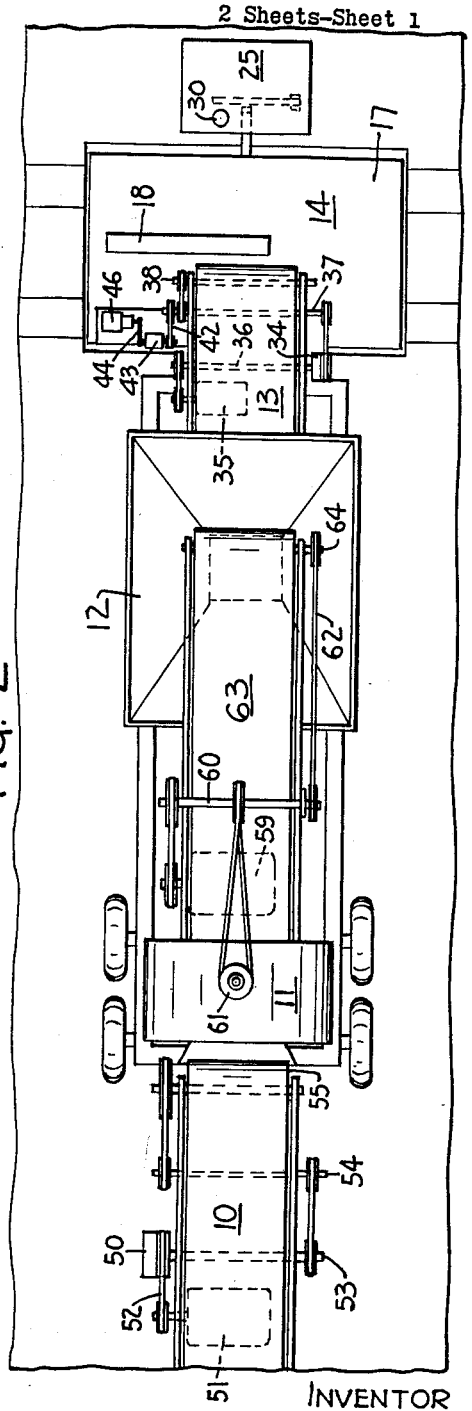
INVENTOR
RALPH B. GUGGEMOS
BY
ATTORNEY

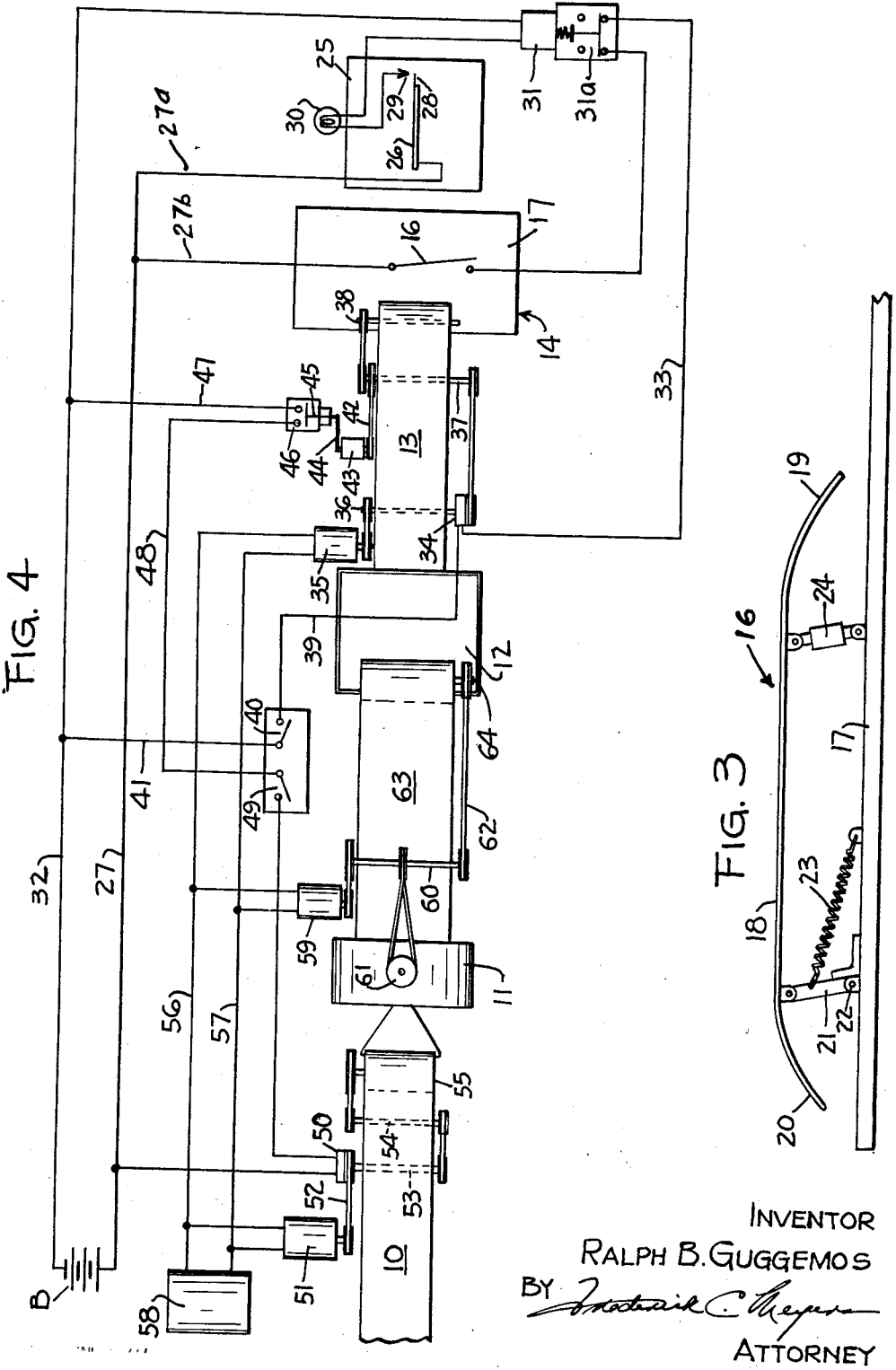

# United States Patent Office 3,074,654
Patented Jan. 22, 1963

3,074,654
CONTROL SYSTEM FOR LOADING AND
WEIGHING ASSEMBLY
Ralph B. Guggemos, 921 Pitt St., Hudson, Wis.
Filed Oct. 10, 1958, Ser. No. 766,622
1 Claim. (Cl. 241—34)

This invention relates to weighing and loading bulk material and, more particularly, to a control system for loading and weighing crushed rock.

In conventional practice for producing crushed rock such as utilized in road building and manufacture of concrete for construction work, the rock is first crushed and then is transferred to a delivery conveyor from which it is loaded into the boxes of dump trucks. Where each dump truck is required to hold a minimum quantity of crushed rock, as for example in road contract work where Government specifications must be met, it is customary to load the truck while it is positioned upon a platform scale to insure loading of the proper amount of material. An operator is, therefore, positioned in a scale house where he observes the weight of material delivered to the truck and, when the scale beam rises, he signals by hand or through such means as an incandescent light the fact that the truck has been filled to the proper degree. A second operator standing on the material conveyor then stops the conveying mechanism so that no more material is delivered to the truck. In a normal operation wherein trucks are loaded with crushed rock for road building purposes, the reaction time of both of the operators often causes a delay which will permit an additional quantity of crushed rock material in excess of the required amount to be delivered to the dump truck. It is not uncommon for four or five hundred extra pounds of material to be added to a full load in this manner. Obviously, the cost of the raw material and crushing thereof becomes a factor in the contractor's profit and continual wastage will seriously affect his overall profit in connection with the delivery of contracted quantities of material. Since each truckload must contain at least the minimum weight of material, there is no opportunity for the contractor to average out his load weights.

The instant invention contemplates solving the foregoing problem and, in addition, will save the expense of one or more operators in connection with the handling of the material.

It is, therefore, an important object of this invention to provide delivery and weighing apparatus for dump trucks and the like which will immediately and automatically stop when a predetermined weight of material has been delivered to the boxes of the truck.

It is a further object of the invention to provide means which will prevent the delivery of bulk material from a conveyor to a dump truck unless the dump truck is positioned upon a scale platform, and also, unless a predetermined minimum load has not yet been delivered to the truck.

It is a further object of the invention to provide mechanism for delivering rock material to a crusher and thence to a surge bin from which it is ultimately delivered in the manner previously described, the energization of the delivery conveyor serving to energize the rock conveyor for maintaining the surge bin with crushed material.

It is a still further object of the invention to provide means responsive to the interruption of the delivery conveyor to permit the continued operation of the rock conveyor and crusher for a predetermined length of time whereby to replenish the surge bin after a truck has driven away with its load and prior to the arrival of a subsequent truck.

These and other objects and advantages of my invention will more fully appear from the following description, made in connection with the accompanying drawings, wherein like reference characters refer to the same parts throughout the several views and in which:

FIGURE 1 is a diagrammatic representation of the side elevation of my assemblage, a truck being in loading position upon the scale platform, unessential portions of the view being cut away;

FIGURE 2 is a top plan view of the assembly, the truck having been removed from the platform, and unessential portions of the view having been cut away;

FIGURE 3 is an enlarged detail of the scale platform switch; and

FIGURE 4 is a schematic view of the entire assemblage including the wiring of electrical circuits therefor.

With continued reference to the drawings, and particularly to FIG. 1, my rock crushing and loading assembly consists generally of a raw material rock conveyor 10 at the back thereof, a rock crusher element 11, a surge bin 12, a forward crushed rock delivery conveyor 13 and a scale platform 14. The raw material is delivered from the back conveyor 10 to the rock crusher 11 which is in constant operation during working hours. From the rock crusher 11, the crushed rock material is delivered to the surge bin 12 at a rate approximately one-third that of the forward crushed rock delivery conveyor 13 which takes the crushed rock from the surge bin and delivers it to a dump truck 15 positioned upon the platform scale 14. If the truck 15 drives away from the platform before acquiring a full load, the delivery conveyor 13 will be immediately de-energized to prevent dumping of crushed rock upon the platform of the scale. In normal operation, the forward delivery conveyor will be de-energized when a predetermined weight has been reached in the loading of truck 15.

An additional feature resides in means for causing simultaneous delivery of rock material from back conveyor 10 to rock crusher 11 during the loading of truck 15 and to permit the continued crushing of rock and delivery thereof to surge bin 12 for a predetermined time following the stopping of the forward crushed rock delivery conveyor 13. The surge bin 12 is thus replenished with excess crushed rock material pending the arrival of the next dump truck.

Referring to FIG. 3, a shoe switch 16 is mounted upon platform 17 of scale 14 and comprises an elongated upper bar 18 having downturned ends 19 and 20. The bar 18 is pivotally supported upon an arm 21 which, in turn, is pivotally mounted at 22 to the platform 17. A tension spring 23 is interposed between platform 17 and arm 21 so as to maintain the bar 18 approximately fourteen inches high for ordinary trucks so that the front axle thereof will engage the bar 18 and cause it to be depressed. A mercury switch 24 is pivotally mounted to the underside of bar 18 and to platform 17 so that when the shoe 18 is depressed, the mercury switch 24 will close an electrical switch therethrough. The bar 18 is long enough so that a dump truck can move forwardly to distribute the incoming load throughout its box without de-energizing the forward conveyor.

Referring now to FIGS. 1 and 4, there is a scale house 25 associated with the scale platform 17 and housing a scale beam 26 which, when raised at the completion of loading, will cause an electrical circuit to be established from battery B through line 27, conductor 27a, through contacts 28—29, signal light 30, time delay solenoid switch 31 to break contacts 31a, then through line 32 back to the battery B. The time delay in switch 31 prevents momentary reactivation by depression of shoe switch 16, as when the rear axle of a truck leaving the scale may accidentally depress the shoe.

The shoe switch 16 and its mercury contacts 24 on the platform 17 will be normally open, as shown in FIG. 4, but when a truck drives thereon will cause a circuit to be established from battery B through conductor 27 to conductor 27b, through normally closed solenoid switch contacts 31a, through line 33 to the electric clutch 34. The energization of electric clutch 34 will establish a driving connection between motor 35, clutch shaft 36, jack shaft 37 and drum drive assembly 38 which causes conveyor 13 to deliver crushed rock to the platform scale 14 and dump truck 15. The remainder of the circuit through electric clutch 34 is established through return line 39, safety switch 40, conductor 41 and through the opposite line 32 to battery B.

When the jack shaft 37 and conveyor drive 38 are in motion, a driving connection 42 from jack shaft 37 will be established for the flyball governor 43. During operation of the flyball governor, the actuator arm 44 will be moved upwardly from its illustrated position so as to push inwardly the switch rod 45 of the time delay switch 46. When time delay switch 46 is closed, a current will be established through the circuit from line 32, conductor 47, switch 46, conductor 48, normally closed safety switch 49, electric clutch 50 and back to line 27 of the battery B. The energization of electric clutch 50 will cause the constantly energized motor 51 to establish a driving connection 52 with the shaft 53 and thence to jack shaft assembly 54. Jack shaft assembly 54 drives the drum assembly 55 which, in turn, operates the raw material rock conveyor 10. It is understood that the conveyor motors 51 and 35 are continuously operated through lines 56 and 57 from a generator 58, as shown.

Another motor 59 is connected to the generator lines 56 and 57 and drives a jack shaft assembly 60 which, in turn, operates the crusher element 11 through drive 61. Also forming a part of the crusher unit is drive 62 which operates crusher belt 63 through drum drive 64.

The operation of my assemblage will be understood from the foregoing and by particular reference to FIGS. 1 and 4. A truck 15 drives upon the platform scale 14 and the front axle thereof depresses the shoe switch 16 so as to close the mercury contacts 24. Since the empty truck is not capable of raising the scale beam 26, the contacts 28 and 29 will remain open and solenoid switch 31 will consequently permit switch contacts 31a to remain closed. Current will flow from line 27 through the shoe switch 16, through closed switch 31a in conductor 33 and will energize the electric clutch 34, the safety switch 40 being closed so as to complete the circuit. Since all of the drive motors 35, 51 and 59 operate continuously during use of the assemblage, the crushed rock delivery conveyor 13 will be engaged and caused to deliver crushed rock from surge bin 12 to the truck 15. As soon as the jack shaft assembly 37 and conveyor 13 begin to move, the flyball governor 43 will cause arm 44 to be shifted and push rod 45 will be depressed and switch contacts 46 established. A circuit is then completed through safety switch 49 and electric clutch 50 so as to engage the constantly energized motor 51 with the raw material conveyor 10. Rock will then be delivered to the constantly energized crusher element 11 and thence to the surge bin 12. As previously pointed out, the crushed rock conveyor 13 operates at a faster rate than the rock crusher and raw material conveyor 10 so that the volume of crushed rock in the surge bin 12 will be progressively diminished until the truck 15 has been filled.

When the proper weight of crushed rock has been delivered to truck 15, then the scale beam 26 will rise and establish contact between points 28 and 29. The external light 30 will then glow and the solenoid switch 31 will be energized so as to break the contacts 31a. The electric clutch 34 will then be de-energized to cause the crushed rock delivery conveyor 13 to stop although motor 35 will continue to operate. As soon as the jack shaft 37 and conveyor 13 stop, the flyball governor 43 will permit its arm 44 to retract from engagement with push rod 45. The time delay switch 46, however, will maintain its closed condition for a predetermined period of time and the electric clutch 50 will remain energized during this period.

The raw material conveyor 10 will continue to deliver its rock to the crusher element 11 which continues to operate even though conveyor 13 has stopped. During this period, the crushed rock in surge bin 12 will be replenished for the length of time permitted by the time delay switch 46. Should another truck fail to arrive before the expiration of the time delay, then the conveyors 10 and 13 will both be stopped and no further rock will be crushed by the crusher 11 though it continues in its operation.

On the other hand, if trucks arrive in rapid sequence so that the surge bin 12 becomes depleted, then the rate of delivery of crushed rock will be limited by the feed of rock from raw material conveyor 10 to crusher 11 and the time delay switch 46 will remain closed at all times. As soon as a truck arrives after the predetermined time delay, the automatic sequence previously noted will again take place.

It may thus be seen that my apparatus conserves on time and labor and, further, prevents waste of finished products.

It will, of course, be understood that various changes may be made in the form, details, arrangements and proportions of the parts without departing from the scope of my invention as set forth in the appended claim.

What I claim is:

In a control system for crushing, delivering and weighing rock material, a scale having a platform and an adjustable scale beam, a normally open switch element mounted on the platform and adapted to be contacted and closed by a dump truck when positioned thereon, a normally closed switch responsive to said scale beam and being adapted to open when the scale beam indicates a given weight of material has been delivered into said dump truck, a crushed rock delivery conveyor terminating over the scale platform and truck when positioned thereon, power means for driving said delivery conveyor, a crusher for supplying crushed rock to said delivery conveyor, a rock conveyor for supplying rocks to said crusher, a surge bin interposed between the crusher and the crushed rock delivery conveyor for accumulating a quantity of crushed rock in between loading periods, a control circuit energizing said power means for driving said delivery conveyor and including in series both the platform switch element and the scale beam switch whereby said delivery conveyor will instantaneously cease to deliver crushed rock to the scale if a truck moves off the platform or the scale beam switch indicates a predetermined load has been delivered to the truck, power means for the rock conveyor, a circuit for energizing the rock conveyor power means, and a timing switch in said rock conveyor power means circuit normally maintaining the circuit in closed condition during operation of the crushed rock delivery conveyor and for a predetermined time after stopping thereof whereby to replenish the surge bin with a quantity of crushed rock.

References Cited in the file of this patent

UNITED STATES PATENTS

| | | |
|---|---|---|
| 615,493 | Richards | Dec. 6, 1898 |
| 1,796,480 | Schellentrager | Mar. 17, 1931 |
| 2,212,419 | Harmon | Aug. 20, 1940 |
| 2,373,838 | Lindholm | Apr. 17, 1945 |
| 2,502,380 | Howard | Mar. 28, 1950 |
| 2,732,164 | Legrow | Jan. 24, 1952 |
| 2,838,299 | Rieser et al. | June 10, 1958 |
| 2,864,561 | Mork | Dec. 16, 1958 |